May 8, 1956   R. J. JANNING   2,744,345
VIEWER
Filed June 1, 1953
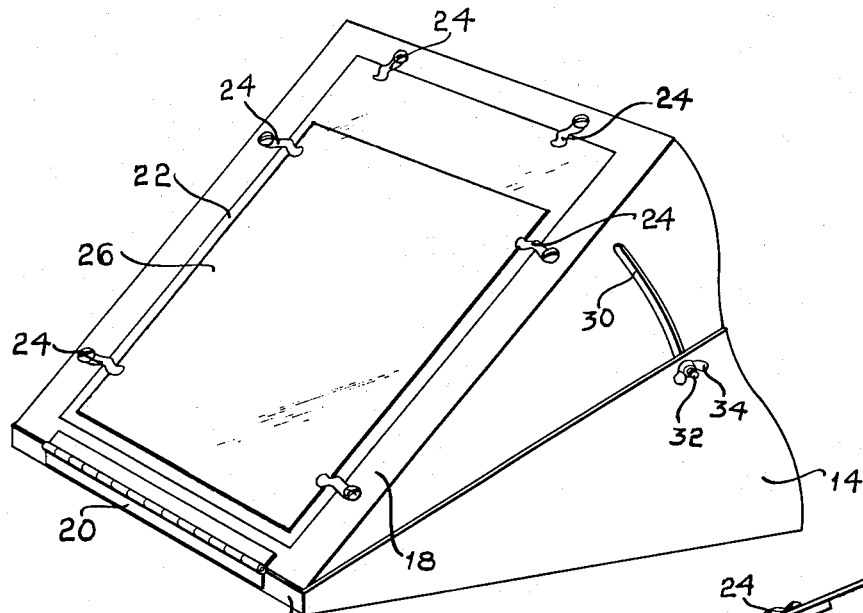
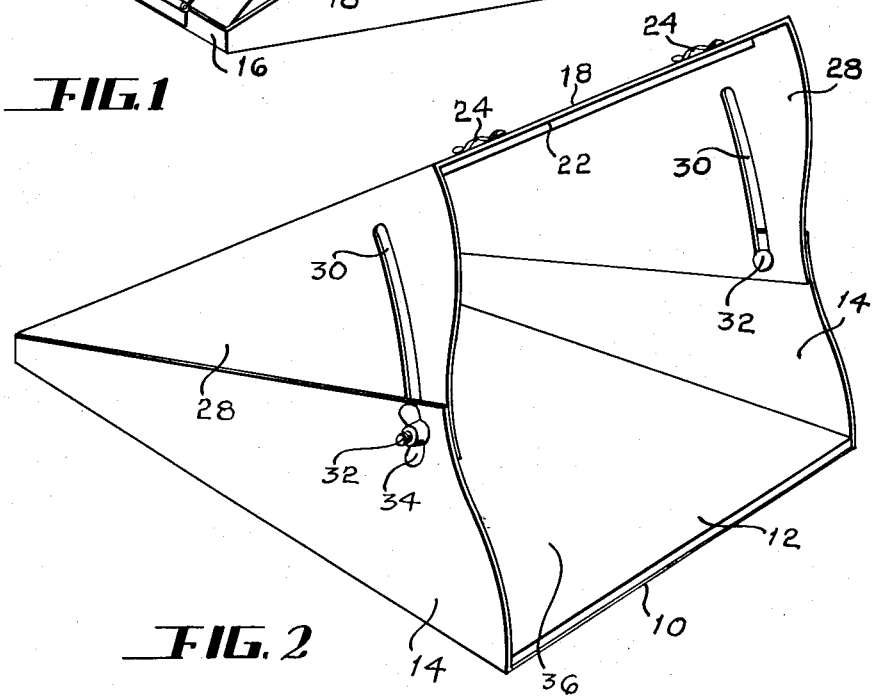
INVENTOR.
ROBERT J JANNING
BY
HIS ATTORNEY

United States Patent Office 2,744,345
Patented May 8, 1956

2,744,345

VIEWER

Robert J. Janning, Dayton, Ohio

Application June 1, 1953, Serial No. 358,839

4 Claims. (Cl. 40—152.2)

This invention relates to a viewer and more particularly to a viewer for use in viewing colored films, although not necessarily so limited.

Numerous attempts have been made to provide viewers for use by artists or craftsmen in reproducing by means of printing the colors that are found on colored films, such as Kodochrome or Ansco colored films. Many of these use artificial light and elaborate equipment for clearly and visually disclosing the colors. However, artificial light has shortcomings, in that artificially produced lights do not contain all of the light wave lengths that are found in the sun's rays.

An object of this invention is to produce a viewer for use in daylight where sufficient light is supplied to clearly bring out the full color effect of the films. This has been accomplished by providing an inclined transparent support for the film, overlying a reflecting surface, so that in addition to the direct rays passing through the film, the rays reflected from the reflecting surface also pass through the film, thereby providing adequate light supplied from a source having all of the light wave lengths, to thereby properly emphasize the various colors and gradations in the colors.

Another object of this invention is to provide a viewer that may be used in daylight and also used with artificial light when, for some reason, daylight is not available.

Another object of this invention is to provide a viewer wherein the support for the film may be adjusted to any desired angle, so as to best emphasize the colors in the film and so as to use the optimum light requirements.

Other objects and advantages reside in the construction of parts, the combination thereof and the mode of operation, as will become more apparent from the following description.

Referring to the drawings,

Figure 1 is a perspective view of a viewer as seen from an angle where the film may be seen.

Figure 2 is another perspective view, showing the viewer from the rear, so to speak, to thereby disclose the reflecting surface.

This viewer includes a base 10 supporting a mirror 12. The mirror may be any suitable mirror, as for example, a sheet of glass coated with mercury or silver. The base 10 merges into a pair of upwardly extending laterally disposed side portions 14. The base 10 and the sides 14 may be made from sheet metal, plastic or any other suitable material.

The leading edge of the base 10 is provided with an upwardly directed flange 16, having mounted thereon a frame member 18 by means of a hinge 20. In the particular embodiment shown, a piano type of hinge has been used. This is a matter of choice. The frame member 18 is provided with a rectangular opening, having mounted therein a sheet of transparent material 22, held in place in any suitable manner. This sheet of transparent material 22 may consist of glass, transparent plastic, such as "Lucite," or any other suitable material. A plurality of hasps or holding members 24 are attached to the frame member 18 and are adapted to hold a film 26 in position. This device may be used with various types and sizes of films or slides.

The frame member 18 has been provided with substantially triangular downwardly projecting side members 28, these side members 28 being provided with arcuate slots 30, the center of curvature of the slots being coincident with the axis of rotation of the hinge 20. These slots 30 permit adjustment of the frame member 18 with respect to the base 10. When the frame member 18 has been adjusted in position, it may be locked in position by suitable bolts 32 provided with wing nuts 34.

In viewing a film, the open end 36 of the viewer is preferably directed towards the light. The film 26 is placed in position upon the transparent sheet of material 22. The film 26 may then be viewed by the observer observing the film at substantially right angles to the film, that is, from a position in front of the device as shown in Figure 1. Two sources of light are available for the film. One source is the light striking the under side directly and the second source is the light reflected from the mirror 12.

In actual practice it has been found that craftsmen obtain more accurate reproductions by using natural daylight with this viewer, than by any other known method, in that daylight provides all, or substantially all of the light waves found in normal sunlight.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A viewer utilizing daylight for viewing colored films provided with a base, a light reflecting mirror fixedly mounted upon the base, said base having a pair of laterally disposed side members extending upwardly from the sides of the base, a transparent film supporting member, means for adjustably supporting the transparent film supporting member in an angular relation with respect to the mirror, said means having downwardly projecting flanges, one on each side thereof, and means for adjustably securing the flanges to the laterally disposed upwardly directed side members.

2. A viewer utilizing daylight for viewing colored films provided with a base, a light reflecting mirror fixedly mounted upon the base, said base having a pair of laterally disposed side members extending upwardly from the sides of the base, a transparent film supporting member, means for adjustably supporting the transparent film supporting member in an angular relation with respect to the mirror, said means having downwardly projecting flanges, one on each side thereof, each of said flanges having slots therein, and screws having wing nuts for adjustably securing the flanges to the laterally disposed side members.

3. A viewer utilizing daylight for viewing colored films provided with a base, a light reflecting mirror fixedly mounted upon the base, said base having a pair of laterally disposed side members extending upwardly from the sides of the base, a transparent film supporting member, means for adjustably supporting the transparent film supporting member in an angular relation with respect to the mirror, said means having downwardly projecting flanges, one on each side thereof, a hinge for interconnecting the film supporting member to the base, and means for adjustably interlocking the flanges and the laterally disposed side members.

4. A viewer according to claim 3, wherein the means for interlocking the flanges and the laterally disposed side members includes slots and bolts.

References Cited in the file of this patent

UNITED STATES PATENTS

| | | |
|---|---|---|
| 1,620,533 | Fullgraff | Mar. 8, 1927 |
| 2,209,668 | Thornton | July 30, 1940 |
| 2,313,453 | Rubel | Mar. 9, 1943 |
| 2,654,173 | Christensen | Oct. 6, 1953 |

FOREIGN PATENTS

| | | |
|---|---|---|
| 11,692 | Great Britain | May 19, 1906 |
| 14,652 | Great Britain | June 21, 1911 |
| 193,676 | Switzerland | Jan. 17, 1938 |